US010450863B2

(12) United States Patent
Jacobs et al.

(10) Patent No.: US 10,450,863 B2
(45) Date of Patent: Oct. 22, 2019

(54) TURBINE ENGINE SHAFT TORQUE SENSING

(71) Applicant: General Electric Company, Schenectady, NY (US)

(72) Inventors: Douglas Scott Jacobs, Cambridge, MA (US); Aaron Jay Knobloch, Guilderland, NY (US); Robert Edward Goeller, Beverly, MA (US); Mudassar Ali Muhammad, Woburn, MA (US); Joseph Alfred Iannotti, Glenville, NY (US)

(73) Assignee: General Electric Company, Schenectady, NY (US)

( * ) Notice: Subject to any disclaimer, the term of this patent is extended or adjusted under 35 U.S.C. 154(b) by 639 days.

(21) Appl. No.: 15/171,359

(22) Filed: Jun. 2, 2016

(65) Prior Publication Data
US 2017/0350253 A1    Dec. 7, 2017

(51) Int. Cl.
*F02C 3/04* (2006.01)
*F01D 5/02* (2006.01)
(Continued)

(52) U.S. Cl.
CPC ............... *F01D 5/02* (2013.01); *F02C 3/04* (2013.01); *G01L 3/045* (2013.01); *G01L 3/108* (2013.01);
(Continued)

(58) Field of Classification Search
None
See application file for complete search history.

(56) References Cited

U.S. PATENT DOCUMENTS 3,106,062 A   10/1963   Rosenberg et al.
3,114,240 A   12/1963   Howard et al.
(Continued)

FOREIGN PATENT DOCUMENTS

EP   1794562 B1   4/2008
EP   2619775 A1   7/2013
(Continued)

OTHER PUBLICATIONS

International Search Report and Written Opinion issued in connection with corresponding PCT Application No. PCT/US2017/33210, dated Aug. 29, 2017.

*Primary Examiner* — Carlos A Rivera
*Assistant Examiner* — Theodore C Ribadeneyra
(74) *Attorney, Agent, or Firm* — Dority & Manning, P.A.

(57) ABSTRACT

A gas turbine engine and system for measuring torque for a gas turbine engine shaft is provided. The system may include a first sensor module, a second sensor module, a first coupler, a second coupler, and a static antenna. The first and second sensor modules may include strain sensors positioned on the gas turbine engine shaft. The first coupler may be positioned on the gas turbine engine shaft and electrically connected with the first sensor module. The second coupler may be positioned on the gas turbine engine shaft and electrically connected with the second sensor module. The static antenna may include a first band and a second band. The first signal band may be in operable communication with the first sensor module and positioned radially outward from the first coupler. The second signal band may be in operable communication with the second sensor module and positioned radially outward from the second coupler.

18 Claims, 6 Drawing Sheets

(51) Int. Cl.
*G01L 3/10* (2006.01)
*G01L 3/04* (2006.01)

(52) U.S. Cl.
CPC ...... *F05D 2220/32* (2013.01); *F05D 2240/60* (2013.01); *F05D 2260/80* (2013.01)

(56) References Cited

U.S. PATENT DOCUMENTS

| | | |
|---|---|---|
| 3,677,000 A | 7/1972 | Thomson |
| 4,593,555 A | 6/1986 | Krutz et al. |
| 6,343,251 B1 | 1/2002 | Herron et al. |
| 6,765,493 B2 | 7/2004 | Lonsdale et al. |
| 6,864,759 B2 | 3/2005 | Lonsdale et al. |
| 7,051,535 B2 | 5/2006 | Acker |
| 7,065,459 B2 | 6/2006 | Kalinin et al. |
| 7,089,794 B2 | 8/2006 | Kalinin et al. |
| 7,165,455 B2 | 1/2007 | Magee et al. |
| 7,202,589 B2 | 4/2007 | Kalinin et al. |
| 7,222,541 B2 | 5/2007 | Lohr et al. |
| 7,237,382 B2 | 7/2007 | Muramatsu et al. |
| 7,302,864 B2 | 12/2007 | Liu et al. |
| 7,307,517 B2 | 12/2007 | Liu et al. |
| 7,343,804 B2 | 3/2008 | Liu et al. |
| 7,380,457 B2 | 6/2008 | Hasken et al. |
| 7,389,682 B2 | 6/2008 | JaVaherian |
| 7,392,714 B2 | 7/2008 | Maguire et al. |
| 7,514,841 B1 | 4/2009 | Cobianu et al. |
| 7,631,564 B1 | 12/2009 | Sihler et al. |
| 7,757,570 B1 | 7/2010 | Marin et al. |
| 7,770,471 B2 | 8/2010 | Lohr et al. |
| 7,795,779 B2 | 9/2010 | Kalinin |
| 7,801,695 B2 | 9/2010 | Moeckly et al. |
| 7,844,414 B2 | 11/2010 | Kalinin |
| 8,015,886 B2 | 9/2011 | Lohr et al. |
| 8,082,800 B2 | 12/2011 | Kalinin |
| 8,127,629 B2 | 3/2012 | Leigh et al. |
| 8,258,674 B2 | 9/2012 | Olariu |
| 8,296,087 B2 | 10/2012 | Kalinin et al. |
| 8,352,149 B2 | 1/2013 | Meacham |
| 8,410,954 B2 | 4/2013 | Duffy et al. |
| 8,423,249 B2 | 4/2013 | Poskie et al. |
| 8,468,898 B2 | 6/2013 | Baller et al. |
| 8,511,166 B2 | 8/2013 | Schiffers et al. |
| 8,516,904 B2 | 8/2013 | Schiffers et al. |
| 8,532,828 B2 | 9/2013 | Schramm et al. |
| 8,539,810 B2 | 9/2013 | Sue et al. |
| 9,152,146 B2 | 10/2015 | Ziarno |
| 2007/0028692 A1 | 2/2007 | Liu |
| 2007/0028700 A1 | 2/2007 | Liu et al. |
| 2009/0288288 A1 | 11/2009 | Watanabe et al. |
| 2009/0314104 A1* | 12/2009 | Lohr ................ G01L 3/1428 73/862.338 |
| 2010/0095740 A1 | 4/2010 | Walton et al. |
| 2012/0210767 A1* | 8/2012 | Sue ................ G01L 3/12 73/1.09 |
| 2014/0000386 A1 | 1/2014 | Malhan et al. |
| 2014/0260685 A1 | 9/2014 | Brummel et al. |
| 2014/0319964 A1 | 10/2014 | Andle et al. |
| 2015/0013461 A1 | 1/2015 | Pollard et al. |
| 2015/0139715 A1* | 5/2015 | Exner ................ G01L 3/108 403/27 |
| 2015/0338295 A1 | 11/2015 | Kalinin et al. |

FOREIGN PATENT DOCUMENTS

| | | |
|---|---|---|
| EP | 2 860 504 A1 | 4/2015 |
| GB | 2355801 A | 10/1999 |
| GB | 2346493 B | 8/2000 |
| GB | 2411239 B | 2/2005 |
| WO | WO2006/035284 A1 | 4/2006 |

* cited by examiner

TURBINE ENGINE SHAFT TORQUE SENSING

FIELD OF THE INVENTION

The present subject matter relates generally to systems and methods for measuring torque.

BACKGROUND OF THE INVENTION

In the field of gas turbine engines, it may be important to closely monitor and accurately measure the torque output of the engine to understand engine performance and health. By closely monitoring output torque values, potential problems can be identified before they occur. For instance, lower than expected torque output can be indicative of sub-optimal engine operation. In addition, output torque values can be used to estimate the life and/or maintenance cycle of various engine components. Real time measurement of output torque values can permit the estimations of the life of an engine component which can be repeatedly updated and revised. Moreover, real time measurement of output torque can be used to guarantee that the required output power is available at any given time.

Measurements of torque are only useful to the degree that they can be considered accurate. Current methods for measuring torque can be limited in their ability to consistently gather accurate information from a rotating shaft. For instance, some systems rely on reluctance sensors to monitor shaft rotation. Such systems can use rotational readings to estimate shaft strain generated at the shaft away from the sensor location. However, by relying on rotational readings alone, relevant information on strain (e.g., thermal strain) can be lost. For instance, existing systems may fail to account for or evaluate the thermal environment at a relevant strain location. This can lead to inaccurate torque measurements.

Other systems can detect shaft strain in order to determine torque. However, these systems may provide only a single signal path for such measurements. If any point along the single path is interrupted, measurements might be lost or compromised. Merely duplicating a single path system may lead to interference and/or conflicting measurements between the duplicated systems. Therefore, existing systems can often be at risk for failing to provide accurate or reliable measurements of torque.

Moreover, existing strain-based sensing systems can require regular service to provide accurate strain measurements due to, for instance, the effects of long term drift or reliability of these systems. Operation of the measured part or apparatus may lead to deviations from the calibration and require recalibration of the sensing system. In the case of a gas turbine engine, the maintenance required for calibration or recalibration can be prohibitively time consuming, repetitive, and/or expensive.

BRIEF DESCRIPTION OF THE INVENTION

Aspects and advantages of the invention will be set forth in part in the following description, or may be obvious from the description, or may be learned through practice of the invention.

In one aspect of the present disclosure, a system for measuring torque for a gas turbine engine shaft is provided. The system may include a first sensor module, a second sensor module, a first coupler, a second coupler, and a static antenna. The first sensor module may include a strain sensor positioned on the gas turbine engine shaft. The second sensor module may include a strain sensor positioned on the gas turbine engine shaft separate from the first sensor module. The first coupler may be positioned on the gas turbine engine shaft and electrically connected with the first sensor module. The second coupler may be positioned on the gas turbine engine shaft and electrically connected with the second sensor module. The static antenna may provide for redundant signal transmission and include a first band and a second band. The first signal band may be in operable communication with the first sensor module and positioned radially outward from the first coupler. The second signal band may be in operable communication with the second sensor module and positioned radially outward from the second coupler.

In another aspect of the present disclosure, a gas turbine engine defining a central axis in an axial direction is provided. The gas turbine engine may include an engine shaft extending along the central axis, a turbine, a first sensor module, a second sensor module, a first coupler, a second coupler, and a static antenna. The turbine may be attached to the engine shaft for providing rotation thereto. The first sensor module may include a strain sensor positioned on the gas turbine engine shaft. The second sensor module may include a strain sensor positioned on the gas turbine engine shaft separate from the first sensor module. The first coupler may be positioned on the gas turbine engine shaft and electrically connected with the first sensor module. The second coupler may be positioned on the gas turbine engine shaft and electrically connected with the second sensor module. The static antenna may provide for redundant signal transmission and include a first band and a second band. The first signal band may be in operable communication with the first sensor module and positioned radially outward from the first coupler. The second signal band may be in operable communication with the second sensor module and positioned radially outward from the second coupler.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
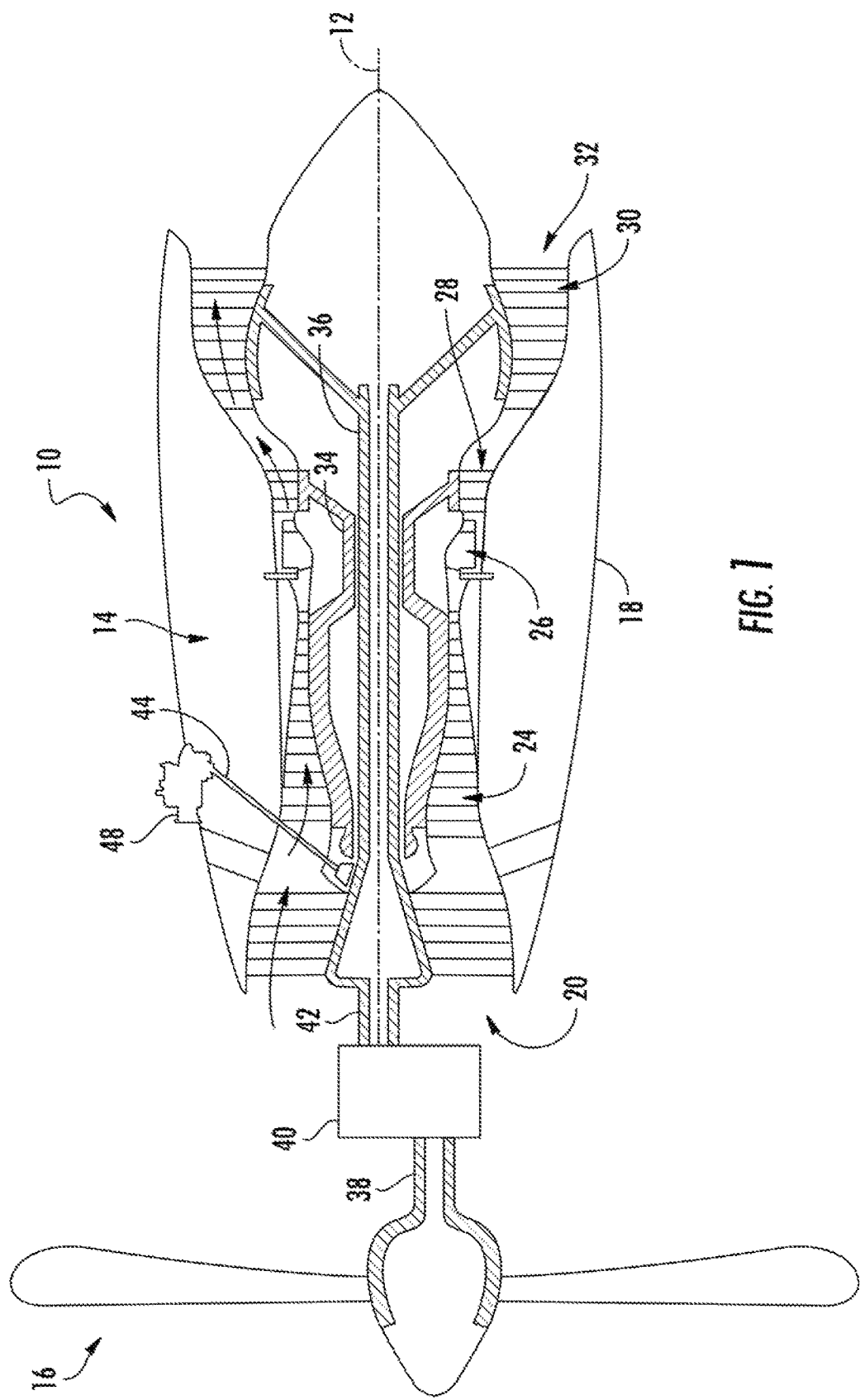
FIG. 1 provides a cross-sectional schematic view of an example gas turbine engine in accordance with one or more embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Example aspects of the present disclosure can include a system for accurately measuring the torque to which one or more engine shafts are subjected. The system may provide redundant measurements and signal paths for the transmission from strain detected at the shaft. Moreover, the measurements can be fully calibrated to inherently compensate for various factors that might otherwise impair accuracy.

Referring now to the drawings, FIG. 1 is a schematic cross-sectional view of an example high-bypass turboprop type engine 10, herein referred to as "turboprop 10," as it can incorporate various embodiments of the present disclosure. In addition, although an example turboprop embodiment is shown, it is anticipated that the present disclosure can be equally applicable to other turbine-powered engines or rotary machines that include a shaft, such as an open rotor engine, a turboshaft engine, a turbofan engine, or other rotary machine.

As shown in FIG. 1, the turboprop 10 has a longitudinal or axial centerline axis 12 that extends in the axial direction A for reference purposes. In general, the turboprop 10 can include a core turbine engine 14 disposed downstream from a fan section 16. The core turbine engine 14 can include a substantially tubular outer casing 18 that defines an annular inlet 20. The outer casing 18 can be formed from multiple casings. Optionally, the outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 can also be connected to a fan spool or shaft 38 of the fan section 16. In particular embodiments, the (LP) spool 36 can be connected directly to the fan spool 38, such as in a direct-drive configuration. In alternative configurations, the (LP) spool 36 can be connected to the fan spool 38 via a speed reduction device 40, such as a reduction gear gearbox in an indirect-drive or geared-drive configuration. Such speed reduction devices can be included between any suitable shafts/spools, such as an engine coupling shaft 42, within the engine 10 as desired or required.

The example turboprop embodiment 10 also includes a radial driveshaft or power take-off shaft 44 that extends from core turbine engine 14 for connection with an accessory gearbox 48. During normal operation, the radial driveshaft 44 transfers power from the engine core 14 to the accessory gearbox 48. During engine startup, the radial driveshaft 44 can also transfer power from a starter located in the accessory gearbox 48 to the engine core 14.

Figure 2:
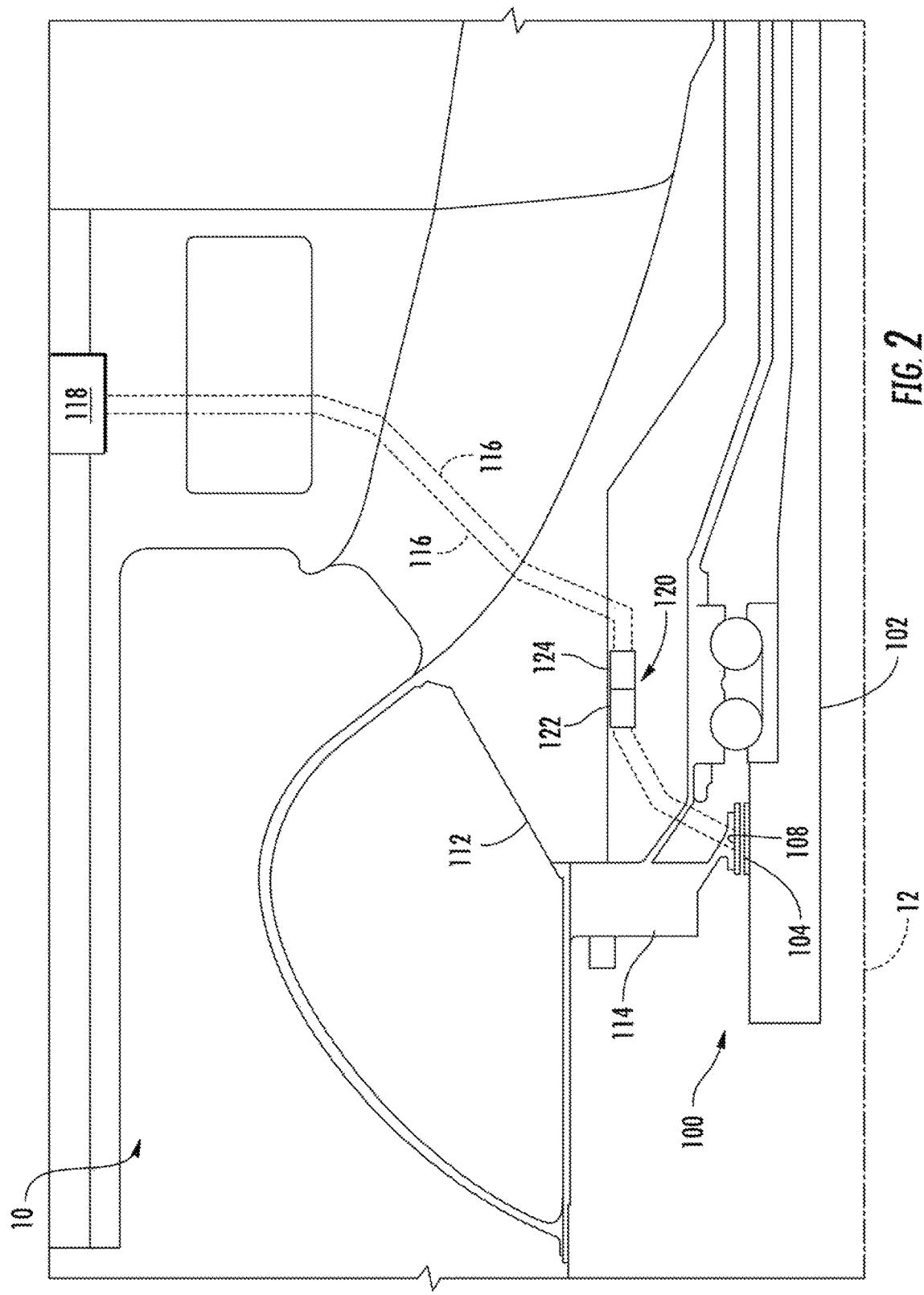
FIG. 2 provides a cross-sectional schematic view of a portion of an example gas turbine engine in accordance with one or more embodiments of the present disclosure.
Figure 3:
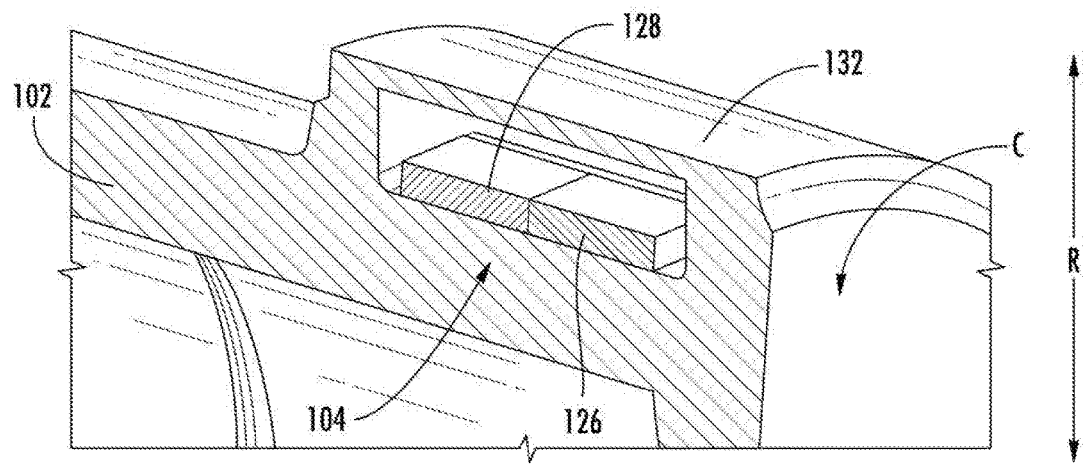
FIG. 3 provides a cross-sectional perspective view of an example gas turbine engine shaft in accordance with one or more embodiments of the present disclosure.
Figure 4:
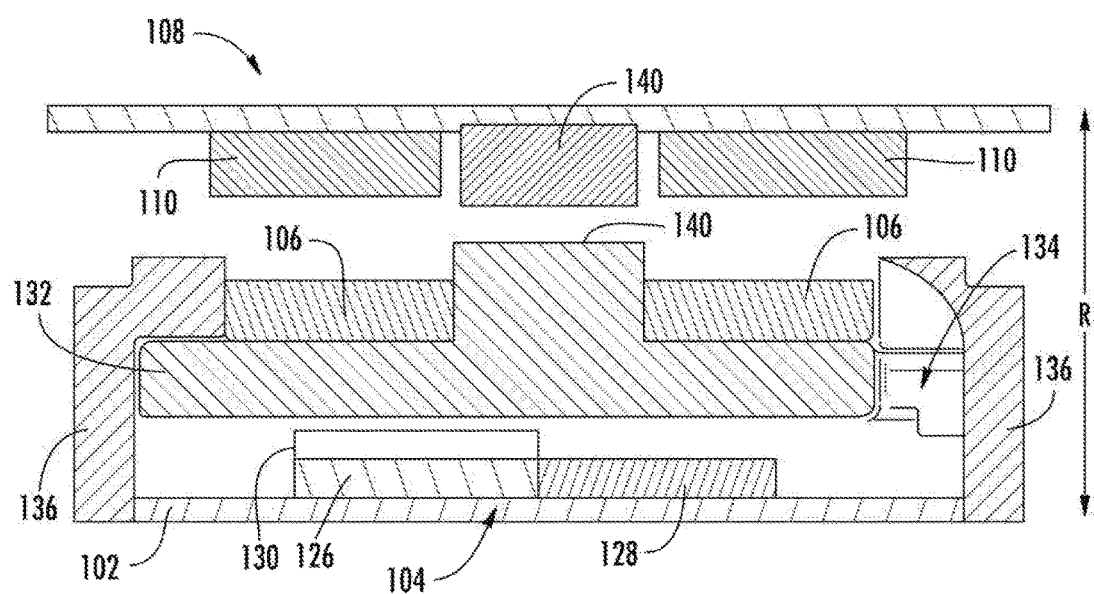
FIG. 4 provides a cross-sectional side view of a portion of an example system in accordance with one or more embodiments of the present disclosure.

Turning to FIGS. 2 through 4, a torque measuring system 100 is attached to an engine shaft 102, which can include, for instance, the power take-off shaft 44, low pressure turbine shaft 36, high pressure turbine shaft 34, fan shaft 38, or engine coupling shaft 42, as described above with respect to FIG. 1. It is also envisioned that additional or alternative embodiments of the engine shaft 102 can include another suitable output shaft that transmits a rotational torque through the engine. The system 100 includes one or more sensor modules 104 disposed on the engine shaft 102 to directly measure torque transmitted through the engine shaft 102. A coupler 106 is electrically connected with each sensor module 104. As shown, the coupler 106 is also disposed on the engine shaft 102, at substantially the same axial location as a respective sensor module 104. However, the coupler 106 may be positioned above the sensor module 104 in the radial direction R (as shown). Advantageously, the positioning of the coupler 106 can be utilized for providing liberation protection for the sensor module 104. In the illustrated embodiment, the coupler 106 is rotationally fixed to the engine shaft 102 as a conductive ring. During operation of the engine 10, rotation of the engine shaft 102 can be transferred to, and mirrored by, the coupler 106. Optionally, the coupler 106 may be formed from one or more suitable conductive materials such as, e.g., copper (including copper alloys) and/or nickel (including nickel alloys). In some embodiments, the coupler 106 extends across and entire circumferential length of the engine shaft 102 (e.g., entirely about the engine shaft 102 in the circumferential direction C). However, alternative embodiments may span only a portion (e.g., half) of the engine shaft's circumferential length in the circumferential direction C. In optional embodiments, the coupler 106 can include one or more protective layer extending across the coupler 106 to prevent liberation at high speeds.

In certain embodiments, a static antenna 108 is aligned with the coupler 106 for signal transmission to/from the sensor module 104. As shown, the static antenna 108 can be axially aligned with the coupler 106, but positioned above the coupler 106 in the radial direction R. However, unlike the coupler 106, the static antenna 108 will be rotationally isolated from the engine shaft 102. Rotation of the engine shaft 102 is not transferred to the static antenna 108. In some embodiments, multiple conductive signal bands 110 are provided for a single static antenna 108. The bands 110 may be formed from one or more suitable conductive materials such as, e.g., copper (including copper alloys) and/or nickel (including nickel alloys). As described below, the static antenna 108 can provide redundant signal transmission for a single system 100.

The static antenna 108 can be fixed to a substantially static non-rotating member of the engine 10. In the embodiment of FIG. 2, the static antenna 108 is attached to a static frame 112. Specifically, the static antenna 108 is fixed at a radially inward location from the static frame 112. In certain embodiments, the static frame 112 encloses at least a portion of the static antenna 108. In some embodiments, the static frame 112 fully encircles the static antenna 108 and prevents radial movement of the static antenna 108 within the engine 10. In the illustrated embodiment, the static antenna 108 is further attached to an output drive assembly 114 slidably disposed within a static frame 112 at a forward portion of the engine 10.

The output drive assembly 114 can include one or more pre-assembled radially member configured to encircle the centerline axis 12 and join one or more torque-induced members (e.g., low pressure turbine shaft 36, high pressure turbine shaft 34, fan shaft 38, or engine coupling shaft 42, as described above with respect to FIG. 1). In optional embodiments, the static antenna 108 is housed within the output drive assembly 114. Appropriate alignment of the static antenna 108 may be accomplished during placement of the output drive assembly 114 within the static frame 112. In addition, during assembly the engine shaft 102 and coupler 106 can be pre-aligned to the static antenna 108 within the output drive assembly 114 before both the engine shaft 102 and the output drive assembly 114 are joined to the front static frame 112 portion of the engine 10.

As seen in FIG. 2, multiple electrical transmission or wiring paths 116 can be routed discretely through the static frame 112 to electrically connect the static antenna 108 to a separate portion of the engine 10, e.g., at one or more controllers or controller units 118. Each wiring path 116 can correspond to discrete static antenna bands 110 (see FIG. 4) and can be electromagnetically isolated from the other. In the illustrated embodiment, a blind mate connector 120 selectively couples separate portions of the wiring path(s) 116. Specifically, a first mated segment 122 at the output drive assembly 114 connects to a second mated segment 124 attached to the static frame 112. The first mated segment 122 and second mated segment 124 may be coupled in, for instance, a suitable mechanical attachment (e.g., male-female engagement wherein one of the first mated segment 122 or the second mated segment 124 comprises a male segment and the other of the first mated segment 122 or the second mated segment 124 comprises a female segment to receive the male segment). As shown, the first mated segment 122 is joined to a wiring segment of the static antenna 108. The second mated segment 124 is similarly joined to a discrete wiring segment extending through the static frame 112 to the controller(s) 118. Advantageously, the blind mate connector 120 allows improved assembly of the system 100.

During assembly, the first mated segment 122 at the output drive assembly 114 can be radially aligned with the second mated segment 124 on the static frame 112. Sliding the output drive assembly 114 axially into the static frame 112 can then bring the two mated segments 122, 124 into electrically coupled engagement. During operation of the system 100, strain measurements obtained from the sensor module(s) 104 can be selectively received by the controller(s) 118 through the coupler 106, static antenna 108, blind mate connector 120, and various wiring segments. Once received, the strain measurements may be used to calculate torque, e.g., via the controller(s) 118.

Turning specifically to FIGS. 3 and 4, an example sensor module 104 embodiment is illustrated. Each sensor module 104 includes a strain sensor 126 disposed on the engine shaft 102. In some embodiments, the strain sensor 126 is configured as a suitable strain-detecting module, such as, e.g., a surface acoustic wave (SAW) sensor. Each strain sensor 126 can be provided with a printed circuit board 128 similarly disposed on the engine shaft 102 for directing or receiving a communications signal through the static antenna 108 and coupler 106, and providing the correct system impedances and inductances.

Optionally, the sensor module 104, including the strain sensor 126, can be disposed within a protective housing 130 and isolated from environmental interference. The protective housing 130 can substantially or completely enclose the strain sensor 126 and prevent unintentional removal from the engine shaft 102. For instance, the protective housing 130 can include a hermetically sealed cap covering the strain sensor 126 and attached to the engine shaft 102, e.g., via one or more adhesives. In additional or alternative embodiments, the protective housing 130 includes a suitable glass frit or liquid crystal polymer package to envelop the strain sensor 126, or a portion thereof. In some such embodiments, a solid substrate including, e.g., a quartz plate, can support the strain sensor 126 disposed on one or more glass frit or liquid crystal polymer layer. Optionally, the substrate can be joined to the shaft 102, e.g., via the strain sensor 126 and/or one or more adhesive. Additionally or alternatively, all or some of the protective housing 130 can be placed within the engine shaft 102, in fixed attachment thereto. Advantageously, the glass frit or liquid crystal polymer package can reduce the potential for hysteresis or inaccurate strain determinations from each strain sensor.

As noted above, the coupler 106 of some embodiments is positioned in axial alignment with the sensor module 104. Moreover, the coupler 106 is positioned radially outward from the sensor module 104. An operable connection can be formed between both the strain sensor 126 and printed circuit board 128, e.g., through one or more wired segments. Together, the coupler 106 and sensor module 104, including wiring therebetween, are optionally mounted between engine shaft 102 and one or more retainer collar 132. As shown, the retainer collar 132 covers at least a portion of the sensor module 104 while supporting one or more couplers 106 thereabove. Optionally, the retainer collar 132 can be provided as a substantially circular ring disposed about the driveshaft in the circumferential direction C. In some embodiments, two or more couplers 106 are supported on the retainer collar 132 at a radially outward position. In other words, the retainer collar 132 is positioned between the sensor module 104 and the coupler 106 in the radial direction R to substantially support the coupler 106, as shown in FIG. 4. In addition, one or more passages 134 can be defined through the retainer collar 132, e.g., in the radial direction R, to accommodate wiring extending between the retainer collar 132 and the sensor module 104.

Optionally, one or more shroud segments 136 can be provided to bound the sensor module 104 in the axial direction. A shroud segment 136 can be formed as a selectively removable member or an integral sidewall extending radially from the engine shaft 102. In the embodiment of FIG. 4, each shroud segment 136 includes a selectively removable ring formed from a non-conductive material and disposed about the engine shaft 102. Two shroud segments 136 are disposed at opposite axial ends of the retainer collar 132 and include a tab arm to partially cover the retainer collar 132 in the radial direction R. In certain embodiments, an adhesive or mechanical attachment fixture can connect the shroud segments 136 to the retainer collar 132.

As shown in FIG. 4, some embodiments include an electromagnetic shield 140 placed between two or more couplers 106. Moreover, the electromagnetic shield 140 extends in the radial direction R from the couplers 106 and hampers or prevents significant electromagnetic interference therebetween, e.g., cross-talk. The material that forms the electromagnetic shield 140 can include any suitable conductive or magnetic material, such as, e.g., copper (including copper alloys), steel, and/or nickel (including nickel alloys). The electromagnetic shield 140 will be formed to match the shape of the couplers 106. For example, if each coupler 106 is provided as a circular ring disposed circumferentially about the engine shaft 102, the electromagnetic shield 140 will follow a similar circumferential path between the two couplers 106. In the illustrated embodiment the electromagnetic shield 140 spans the couplers 106 in the radial direction R and extends above the couplers 106 in the same direction. The electromagnetic shield 140 can extend integrally from an area of the retainer collar 132, or be formed as a separate discrete member between each coupler 106.

As also shown in FIG. 4, additional or alternative embodiments can include an electromagnetic shield 140 at the static antenna 108. In some such embodiments, the electromagnetic shield 140 is disposed between two or more bands 110. Moreover, the electromagnetic shield 140 extends from the static antenna 108 radially inward towards the engine shaft 102. The electromagnetic shield 140 at the static antenna 108 will be formed to match the shape of the two or more bands 110. For example, if each band 110 is provided as a semi-circular arc disposed semi-circumferentially about the engine shaft 102, the electromagnetic shield 140 will follow a similar semi-circumferential path between the two bands 110. In the illustrated embodiment the electromagnetic shield 140 spans the bands 110 in the radial direction R and extends below both bands 110 in the same direction.

Optionally, the two bands 110 may each be operably mated to a corresponding coupler 106. Each coupler 106 is, thus, fixed to be coaxial with a mated band 110. In some such embodiments, an electromagnetic shield 140 at the static antenna 108 will be matched with an electromagnetic shield 140 at the retainer collar 132/engine shaft 102. In turn, the electromagnetic shield 140 at the retainer collar 132 is axially-aligned with the electromagnetic shield 140 at the static antenna 108. A radial gap can be defined between the electromagnetic shields 140, preventing direct engagement and friction between the electromagnetic shields 140.

As shown in FIG. 4, one pair of an operably matched coupler 106 and band 110 can be spaced in the axial direction A from another pair of an operably matched coupler 106 and band 110. In certain embodiments, the distance between each coupler-band pair will correspond to a set fixed distance. Optionally, the distance may be fixed according to a predetermined distance at which interference between each coupler-band pair is negligible, absent any electromagnetic shielding. For instance, each coupler-band pair may be spaced at least 2 inches apart in the axial direction A.

Figure 5:
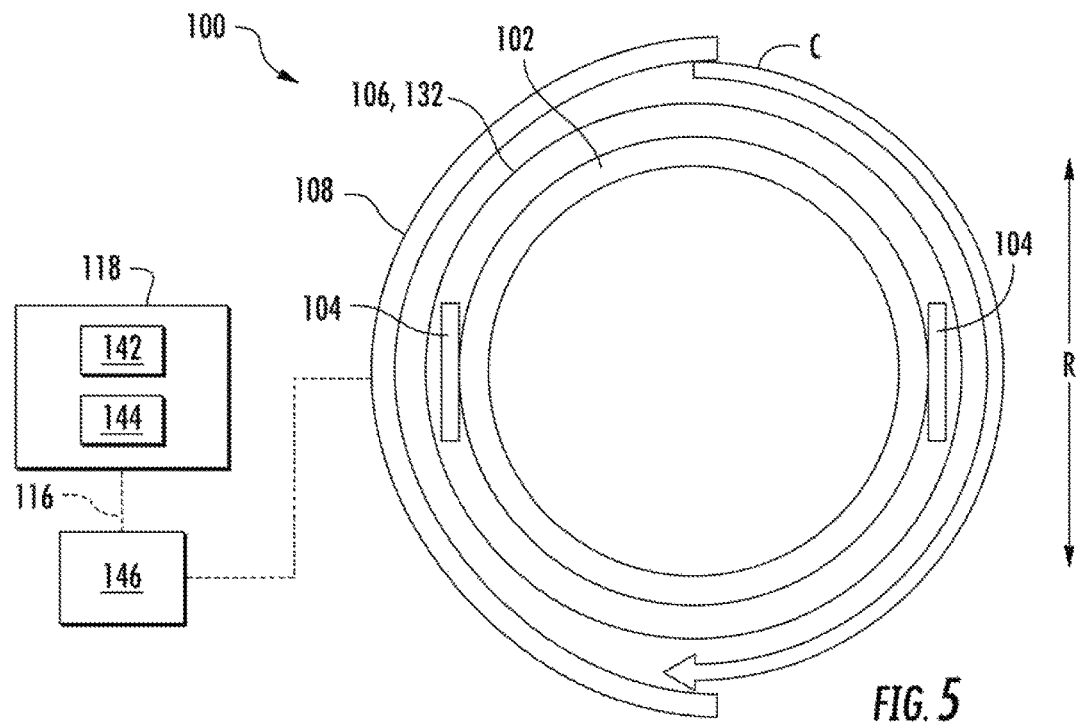
FIG. 5 provides a cross-sectional schematic front view of an example gas turbine engine shaft in accordance with one or more embodiments of the present disclosure.
Figure 6:
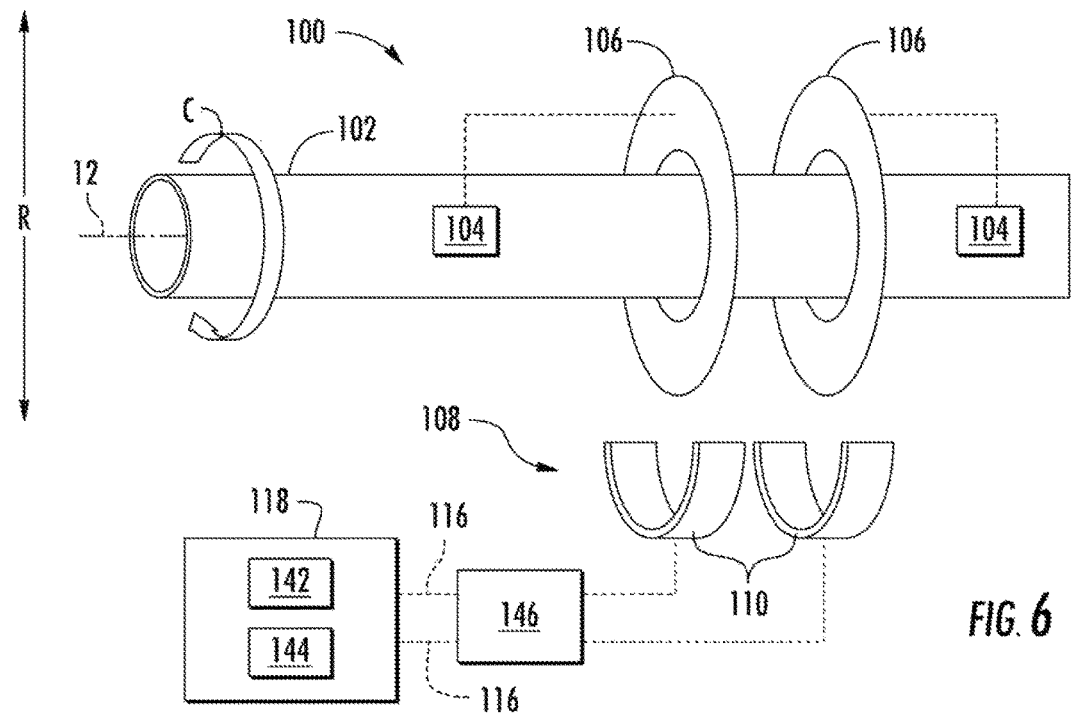
FIG. 6 provides a schematic view of an example system in accordance with one or more embodiments of the present disclosure.

Turning to FIGS. 5 and 6, the coupler(s) 106 disposed on the engine shaft 102 may be operably mated to a corresponding static antenna band/band set. Wireless signals can be transmitted between each operably mated coupler-band pair. During operation, a sensor module 104 can be wirelessly interrogated from the controller(s) 118 through a mated coupler 106 and band 110. In turn, the controller(s) 118 can be configured to receive and/or send signals to the sensor module 104, e.g., through one or more wiring paths 116. Information detected at one or more strain sensors 126, e.g., strain and/or temperature, can be transferred to the controller(s) 118 before, during, or after rotation of the engine shaft 102 about the central axis 12. Information obtained from the sensors(s) 126 can be selectively transmitted to the controller(s) 118, e.g., via the coupler 106 and static antenna 108, and used to calculate torque.

In some embodiments, multiple sensor modules 104 are provided. In the illustrated embodiment, each sensor module 104 is axially aligned at opposite circumferential positions or ends of the engine shaft 102 to detect strain values subsequently transferred to the controller(s) 118 (see FIG. 5). Although two sensor modules 104 are shown, alternative embodiments can include more or fewer sensor modules 104 (e.g., more than two torque sensors) disposed at different circumferential locations. Moreover, as should be appreciated to those skilled in the art, using the disclosures provided herein, measurements of deformation between the sensor modules 104 can help determine the amount of torque, strain rate, fatigue, stress, bending, etc. at that region of the engine shaft 102.

A controller 118 can include one or more processors 142. The processor(s) 142 can be configured for receiving calibration parameters of the sensor modules 104 and generating calibrated torque values according to one or more sensor signals received from the sensor modules 104. Optionally, the controller 118 can include a full authority digital engine control (FADEC), or another suitable engine control unit. In some embodiments, one or more controllers 118 include a discrete processor memory unit 144 in operable communication with the processor(s) 142.

As shown, the processor(s) 142 can be in operable communication with the sensor module(s) 104 and a remote memory storage unit 146. The processor(s) 142 can include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor(s) 142 can also include a microprocessor, or a combination of the aforementioned devices (e.g., a combination of a DSP and a microprocessor, a plurality of microprocessors, one or more microprocessors in conjunction with a DSP core, or any other such configuration).

In optional embodiments, one or more local memory units 144 can be provided and comprise one or more memory elements. For instance, the local memory unit(s) 144 can include, but are not limited to, computer readable medium (e.g., random access memory (RAM)), computer readable non-volatile medium (e.g., a flash memory, EEPROM, NVRAM or FRAM), and/or other suitable memory elements. The memory unit(s) 144 can store information accessible by processor(s) 142, including instructions that can be executed by processor(s) 142 or information, e.g., calibration information, about the engine shaft 102 or sensor module(s) 104. For example, the instructions can be software or any set of instructions that when executed by the processor(s) 142, cause the processor(s) 142 to perform operations. For the embodiment depicted, the instructions can include a software package configured to operate the system 100.

In further optional embodiments, one or more remote memory storage units 146 are provided. The remote memory storage unit(s) 146 can include, but are not limited to, computer readable medium (e.g., random access memory (RAM)), computer readable non-volatile medium (e.g., a flash memory, EEPROM, NVRAM or FRAM), and/or other suitable memory elements. In certain embodiments, the remote memory storage unit(s) 146 is/are operably connected between one or more sensor modules 104 and the controller(s) 118, e.g., between the static antenna 108 and the controller(s) 118. For instance, the remote memory storage unit(s) 146 can be disposed on the output drive assembly 114 in operable communication between the static antenna 108 and the first mated segment 122 of the blind mate connector 120 (see FIG. 2). Operational instructions and/or calibration information for the sensor module(s) 104 optionally stored in the remote memory storage unit(s) 146. Accordingly, calibration information can be received by the processor(s) 142 as part of part of a signal initially transmitted from the sensor module 104 (e.g., as a single output signal).

The calibration information can provide a known or estimated relationship between a measured value and an actual or accurate value. Specifically, information concerning one or more correction parameters can be included as part of the calibration information stored on the remote memory storage unit(s) 146. In certain embodiments, an engine model is further included. The engine condition model can associate the correction parameter with measurements obtained from the sensor module(s) 104. For instance, the engine condition models can correlate a measured strain and/or temperature value against a model strain and/or temperature value. In other words, the engine condition models of such embodiments establishes a relationship between the measurements that are initially obtained from the sensor module(s) 104 (i.e., measured values) and a more accurate value of the strain and/or temperature conditions at the engine shaft 102 (i.e., rectified values). In one example embodiment, once strain and temperature measurements are obtained, the engine condition model can allow the obtained measurements to be used with the correction parameter to generate a rectified torque value. Optionally, the engine condition model can include a suitable algorithm, predetermined data graph, or correlated reference table that links a measured value to a rectified value.

In some embodiments, the engine condition model can be contingent upon predetermined historical data values. The historical data values can be provided from past values obtained by testing at known conditions. For example, the correction parameter can adjust a newly-obtained strain measurement based on past measurements at one or more known temperatures. In alternative or additional embodiments, the correction parameter can adjust an obtained strain measurement based on past measurements at one or more known rotational velocities. Moreover, the correction parameter can adjust an obtained strain measurement based on other measurements, such as vibration at the engine shaft 102, exhaust gas temperature, engine inlet temperature, or engine combustion pressure. Thus, the correction parameter can include rotational velocity of the engine shaft 102, temperature at the engine shaft 102, vibration at the engine shaft 102, exhaust gas temperature, inlet temperature, or engine combustion pressure.

In optional embodiments, a discrete remote memory storage unit 146 is provided for each sensor module 104. In some such embodiments, the remote sensor module 104 will be disposed in operable communication between a respective sensor module 104 and controller 118. Calibration information for the respective sensor module 104 will be stored in the corresponding remote memory storage unit 146. In additional or alternative embodiments, calibration information for one or more other sensor modules 104 can also be stored as redundancies in each memory storage unit 146. In embodiments having two or more sensor modules 104, the redundancies in each remote memory storage unit 146 can provide calibration information in circumstances where one remote memory storage unit 146 is compromised or interrupted.

In further optional embodiments, the calibration information derived for a single sensor module 104 can be included in a plurality of remote memory storage units 146. In other words, the remote memory storage units 146 of multiple discrete systems 100 will include substantially identical calibration information. After a first system unit is calibrated, that calibration information can be subsequently incorporated in succeeding system units. Advantageously, this can allow multiple system units to be calibrated according to the engine condition model derived for a single unit, reducing calibration and service time required for each system unit.

Figure 7:
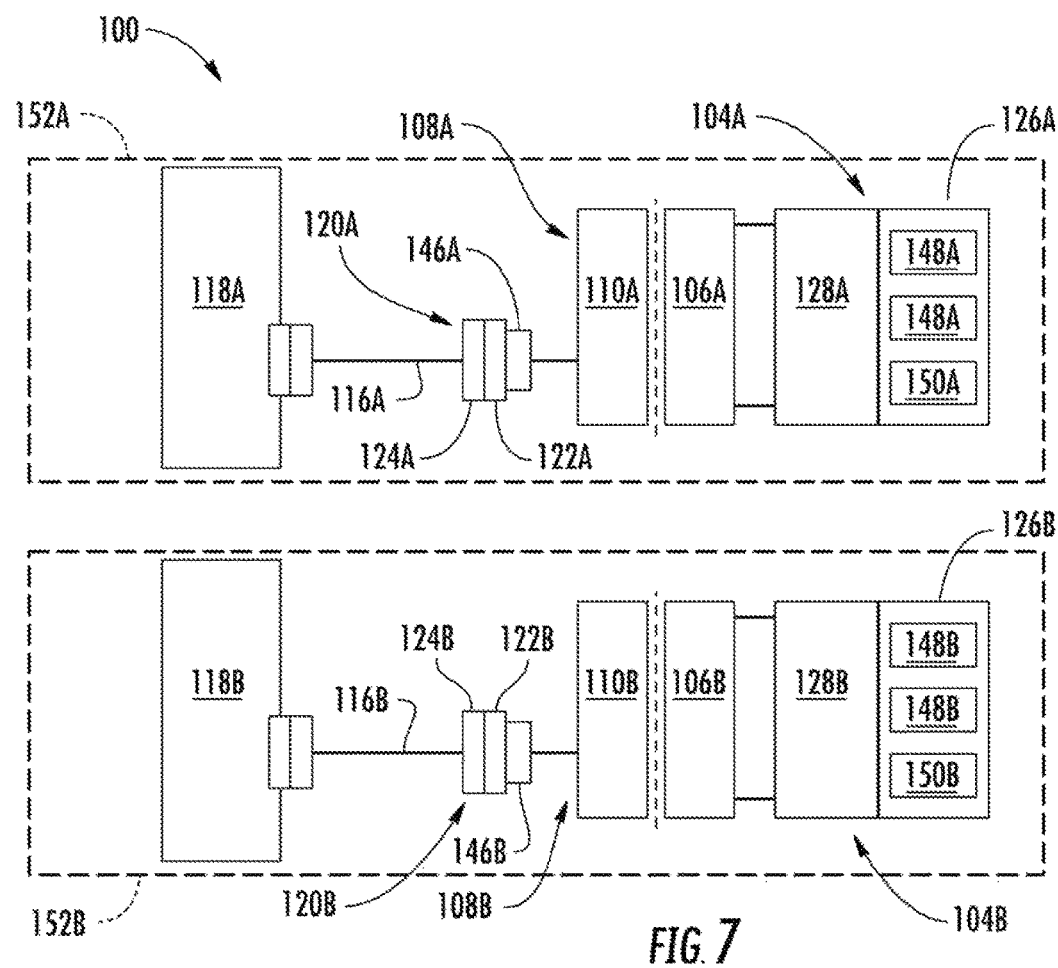
FIG. 7 provides a schematic view of an example system in accordance with one or more embodiments of the present disclosure.

As shown in FIG. 7, some embodiments of the system 100 include multiple isolated channels 152A, 152B for operable communication from the engine shaft 102 (see FIG. 2). In the illustrated embodiment, each channel 152A, 152B includes a sensor module 104A, 104B having a printed circuit board 128A, 128B and a strain sensor 126A, 126B configured as an example SAW sensor. Each example SAW strain sensor 126A, 126B includes two or more strain resonators 148A, 148B configured to detect strain at a respective sensor module 104A, 104B. Optionally, a temperature resonator 150A, 150B can be provided at one or more of the SAW strain sensors 126A, 126B. Moreover, each temperature resonator 150A, 150B can be configured to detect temperature at the respective sensor module 104A, 104B.

In some embodiments, the strain sensor 126A of the first channel 152A is a high-frequency SAW sensor configured to operate at a first frequency, while the strain sensor 126B of the second channel 152B is a low-frequency SAW sensor configured to operate at the second frequency. Although various different frequencies/frequency ranges can be provided for the first and second frequency (e.g., as predetermined frequency sets), generally, the first frequency will be greater than the second frequency. For instance, the strain sensor 126A may operate at a plurality of predetermined frequencies (i.e., a first predetermined frequency set), while the strain sensor 126B operates at a discrete plurality of predetermined frequencies (i.e., a second predetermined frequency set). Each frequency within the second predetermined frequency set may be lower than each frequency within the first predetermined frequency set. Optionally, a minimum difference in frequency may be set between the first frequency (e.g., first frequency set) and the second frequency (e.g., second frequency set). In one embodiment, the difference or minimum difference between the first frequency and the second frequency is in the range of about 5 to about 50 MHz. In certain embodiments, the minimum difference between the first frequency and the second frequency is about 10 MHz.

As shown in FIG. 7, each sensor module 104A, 104B connects to a separate coupler 106A, 106B via a separate printed circuit board 128A, 128B. In turn, the coupler 106A, 106B is operably communicated to a band 110A, 110B of the static antenna 108A, 108B; which is connected to a remote memory storage unit 146A, 146B via the first mated segment 122A, 122B and second mated segment 124A, 124B of the blind mate connector 120A, 120B. From the blind mated connector 120A, 120B and remote memory storage unit 146A, 146B; the band 110A, 110B of the static antenna 108A, 108B connects to a controller 118A, 118B through the separate wires along either a single or multiple paths 116A, 116B.

Although a single band 110A, 110B is shown for each of two discrete static antennas 108A, 108B in FIG. 7; it should be appreciated that some embodiments can include multiple discrete bands on one or more static antennas, e.g., two discrete bands on a single static antenna or two discrete bands on each of two discrete static antennas. Moreover, although two separate controllers 118A, 118B are illustrated, it is envisioned that the two or more channels 152A, 152B of system 100 can each lead to a single controller.

During operation of the system 100, strain and/or temperature values detected at each sensor module 104A, 104B are delivered through the printed circuit board 128A, 128B and coupler 106A, 106B to a corresponding band 110A, 110B of each static antenna 108A, 108B. From each static antenna 108A, 108B, the strain and/or temperature values are delivered through the discrete wiring paths 116A, 116B to the controller 118A, 118B wherein torque is calculated.

Figure 8:
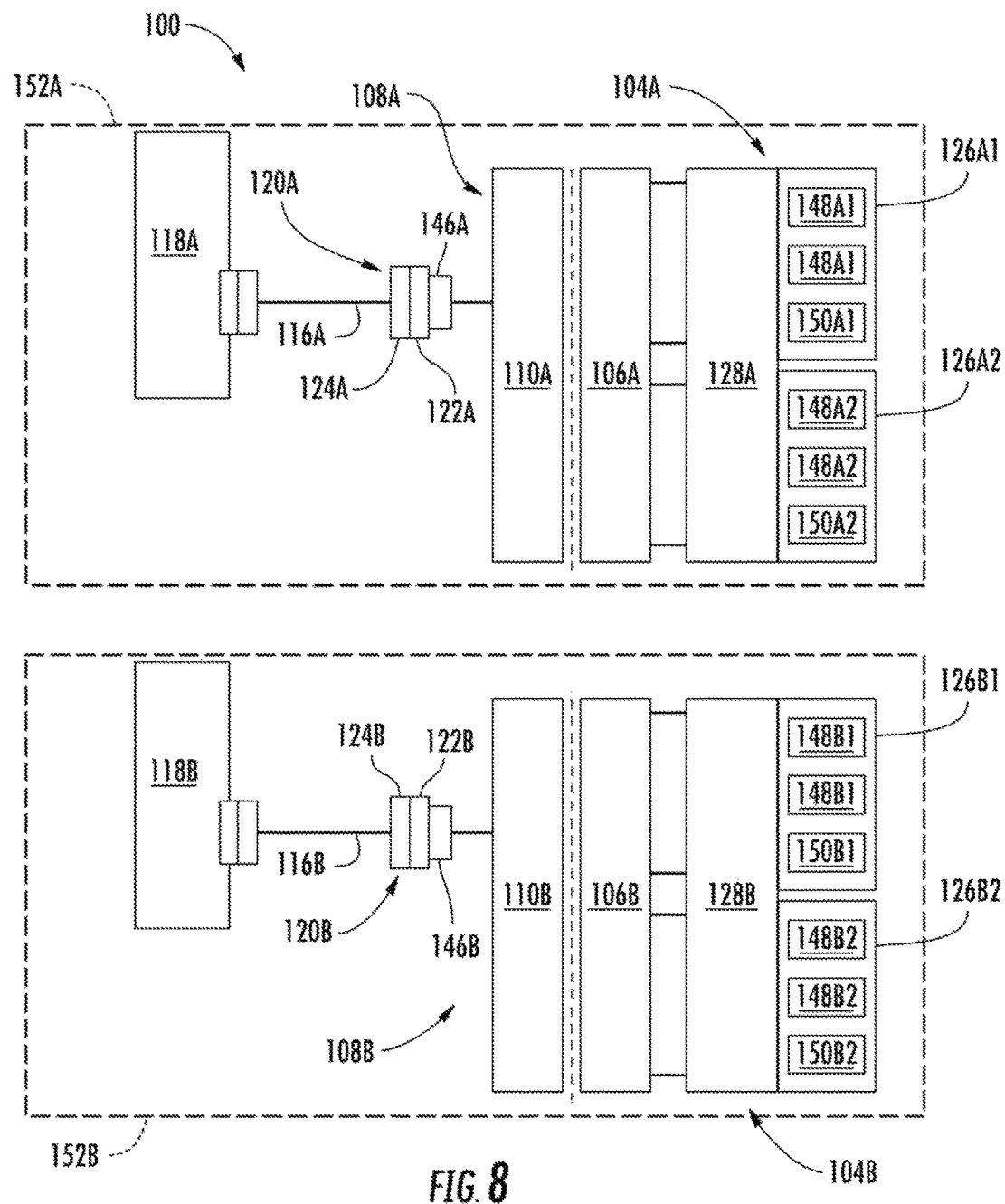
FIG. 8 provides a schematic view of another example system in accordance with one or more embodiments of the present disclosure.

Turning to FIG. 8, another illustrated embodiment of the system 100 is provided. It should be understood that the elements and features of the shown embodiment are substantially the same as those of FIG. 7, except as otherwise indicated. For instance, each of the sensor modules 104A, 104B includes multiple discrete strain sensors 126A1, 126A2, 126B1, 126B2, each configured as a discrete SAW sensor. In the illustrated embodiment, the sensor module 104A of the first channel 152A includes a primary high-frequency strain sensor 126A1 and a secondary low-frequency strain sensor 126A2. The sensor module 104B of the second channel 152B includes a primary high-frequency strain sensor 126B1 and a secondary low-frequency strain sensor 126B2. Each strain sensor 126A1, 126A2, 126B1, 126B2 may be connected to a printed circuit board 128A, 128B and coupler 106A, 106B. As shown, each strain sensor 126A1, 126A2, 126B1, 126B2 can also include two or more strain resonators 148A1, 148A2, 148B1, 148B2 and/or a temperature resonator 150A1, 150A2, 150B1, 150B2. Optionally, an electromagnetic shield may be provided between each channel 152A, 152B, as described above. During operation of the system 100, multiple SAW sensor readings can be advantageously obtained and transmitted without interference between each strain sensor 126A1, 126A2, 126B1, 126B2.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for measuring torque for a gas turbine engine shaft, the gas turbine engine shaft defining a central axis in an axial direction, the system comprising:
   a first sensor module including a strain sensor positioned on the gas turbine engine shaft;
   a second sensor module including a strain sensor positioned on the gas turbine engine shaft separate from the first sensor module;
   a first coupler positioned on the gas turbine engine shaft and electrically connected with the first sensor module;
   a second coupler positioned on the gas turbine engine shaft and electrically connected with the second sensor module;
   a static antenna for redundant signal transmission, the static antenna including
      a first signal band in operable communication with the first sensor module and positioned radially outward from the first coupler, and
      a second signal band in operable communication with the second sensor module and positioned radially outward from the second coupler;
   a controller operably connected to the static antenna for receiving a signal therefrom;
   a first remote memory storage unit in operable communication between the static antenna and the controller; and
   a first wiring path between the static antenna and the controller, wherein the first remote memory storage unit is disposed along the first wiring path.

2. The system of claim 1, further comprising:
   an electromagnetic shield disposed between the first coupler and the second coupler in the axial direction for hampering signal communication between the first coupler and the second coupler.

3. The system of claim 1, wherein the strain sensor of the first sensor module is high-frequency surface acoustic wave (SAW) sensor configured to operate at a first frequency, and wherein the strain sensor of the second sensor module is a low-frequency SAW sensor configured to operate at a second frequency, the second frequency being lower than the first frequency.

4. The system of claim 1, wherein the first sensor module includes a primary high-frequency surface acoustic wave (SAW) sensor and a secondary low-frequency SAW sensor, and wherein the second sensor module includes a primary high-frequency SAW sensor and a secondary low-frequency SAW sensor.

5. The system of claim 1, wherein the strain sensor of the first sensor module includes a first strain resonator, a second strain resonator, and a temperature resonator, and wherein the strain sensor of the second sensor module includes a strain resonator and a temperature resonator.

6. The system of claim 1, wherein the first sensor module includes a protective housing enclosing the strain sensor of the first sensor module, and wherein the second sensor module includes a protective housing enclosing the strain sensor of the second sensor module.

7. The system of claim 1, further comprising:
   a second remote memory storage unit in operable communication between the static antenna and the controller; and
   a second wiring path between the static antenna and the controller, the second wiring path being electromagnetically isolated from the first wiring path.

8. The system of claim 7, wherein the second remote memory storage unit is disposed along the second wiring path, and wherein the first remote memory storage unit and the second remote memory storage unit store calibration information for the first sensor module and the second sensor module.

9. A gas turbine engine defining a central axis in an axial direction, the gas turbine engine comprising:
an engine shaft extending along the central axis;
a turbine attached to the engine shaft for providing rotation thereto;
a first sensor module including a strain sensor positioned on the engine shaft;
a second sensor module including a strain sensor positioned on the engine shaft separate from the first sensor module;
a first coupler positioned on the engine shaft and electrically connected with the first sensor module;
a second coupler positioned on the engine shaft and electrically connected with the second sensor module; and
a static antenna for redundant signal transmission, the static antenna including
a first signal band in operable communication with the first sensor module and positioned radially outward from the first coupler, and
a second signal band in operable communication with the second sensor module and positioned radially outward from the second coupler;
a controller operably connected to the static antenna for receiving a signal therefrom;
a first remote memory storage unit in operable communication between the static antenna and the controller; and
a first wiring path between the static antenna and the controller, wherein the first remote memory storage unit is disposed along the first wiring path.

10. The gas turbine engine of claim 9, further comprising:
a static frame member enclosing at least a portion of the engine shaft;
an output drive assembly disposed radially inward from the static frame member, wherein the static antenna is housed within the output drive assembly; and
a blind mate connector, including a selectively-coupled first mated segment and second mated segment, the first mated segment being attached to the output drive assembly and the second mated segment being attached to the static frame member.

11. The gas turbine engine of claim 9, further comprising;
an electromagnetic shield disposed between the first coupler and the second coupler in the axial direction.

12. The gas turbine engine of claim 9, wherein the first sensor module is a high-frequency surface acoustic wave (SAW) sensor configured to operate at a first frequency, and wherein the second sensor module is a low-frequency SAW sensor configured to operate at a second frequency, the second frequency being lower than the first frequency.

13. The gas turbine engine of claim 9, wherein the first sensor module includes a primary high-frequency surface acoustic wave (SAW) sensor and a secondary low-frequency SAW sensor, and wherein the second sensor module includes a primary high-frequency SAW sensor and a secondary low-frequency SAW sensor.

14. The gas turbine engine of claim 9, wherein the strain sensor of the first sensor module includes a first strain resonator, a second strain resonator, and a temperature resonator, and wherein the strain sensor of the second sensor module includes a strain resonator and a temperature resonator.

15. The gas turbine engine of claim 9, wherein the engine shaft includes a power take-off shaft, a low pressure turbine shaft, a high pressure turbine shaft, a fan shaft, or an engine coupling shaft.

16. The gas turbine engine of claim 9, wherein the first sensor module includes a protective housing enclosing the strain sensor of the first sensor module, and wherein the second sensor module includes a protective housing enclosing the strain sensor of the second sensor module.

17. The gas turbine engine of claim 9, further comprising:
a second remote memory storage unit in operable communication between the static antenna and the controller; and
a second wiring path between the static antenna and the controller, the second wiring path being electromagnetically isolated from the first wiring path.

18. The gas turbine engine of claim 17, wherein the second remote memory storage unit is disposed along the second wiring path, and wherein the first remote memory storage unit and the second remote memory storage unit store calibration information for the first sensor module and the second sensor module.

* * * * *